United States Patent
Bender et al.

(10) Patent No.: US 8,999,544 B2
(45) Date of Patent: Apr. 7, 2015

(54) ELECTRIC ENERGY STORE OF A MOTOR VEHICLE

(75) Inventors: Stefan Bender, Ludwigsburg (DE); Guan Chew, Bietigheim-Bissingen (DE); Steffen Maurer, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 412 days.

(21) Appl. No.: 13/370,618

(22) Filed: Feb. 10, 2012

(65) Prior Publication Data

US 2012/0208057 A1 Aug. 16, 2012

(30) Foreign Application Priority Data

Feb. 14, 2011 (DE) .................... 10 2011 000 696

(51) Int. Cl.
*H01M 2/10* (2006.01)
*H01M 10/613* (2014.01)
*H01M 10/615* (2014.01)
*H01M 10/625* (2014.01)
*H01M 10/6555* (2014.01)

(52) U.S. Cl.
CPC ........ *H01M 2/1083* (2013.01); *H01M 10/5004* (2013.01); *H01M 10/5006* (2013.01); *H01M 10/5016* (2013.01); *H01M 10/5055* (2013.01)

(58) Field of Classification Search
CPC ....... H01M 2/00; H01M 2/02; H01M 2/0245; H01M 2/0247
USPC ............................ 429/149, 120, 99, 163, 176
See application file for complete search history.

(56) References Cited

U.S. PATENT DOCUMENTS

| 7,485,983 | B2 | 2/2009 | Asao et al. |
| 8,011,467 | B2 | 9/2011 | Asao et al. |
| 2011/0294000 | A1 * | 12/2011 | Kim et al. ..................... 429/176 |
| 2012/0009455 | A1 * | 1/2012 | Yoon ............................. 429/120 |

FOREIGN PATENT DOCUMENTS

| CN | 101546843 | 9/2009 |
| DE | 10 2008 010 829 | 11/2009 |
| DE | 102008010829 | * 11/2009 |
| DE | 10 2008 059 680 | 6/2010 |
| DE | 20 2009 008 503 | 12/2010 |
| DE | 102009035487 | 2/2011 |

OTHER PUBLICATIONS

English translation of DE 102008010829 A1, Meintschel J et al., Germany, Nov. 2009.*

* cited by examiner

*Primary Examiner* — Jonathan Jelsma
*Assistant Examiner* — Rashid Alam
(74) *Attorney, Agent, or Firm* — Gerald E. Hespos; Michael J. Porco; Matthew T. Hespos

(57) ABSTRACT

An electric energy store (10) of a motor vehicle, in particular a high voltage energy store of a hybrid vehicle or an electric vehicle, has a housing (11) and storage modules (12) accommodated in the housing. The housing (11) has a supporting element (17) with an annular supporting frame (18) made from a fiber reinforced plastic and via which the electric energy store (10) can be connected to a body structure of a motor vehicle.

16 Claims, 2 Drawing Sheets

US 8,999,544 B2

ELECTRIC ENERGY STORE OF A MOTOR VEHICLE

CROSS REFERENCE TO RELATED APPLICATION

This application claims priority under 35 USC 119 to German Patent Appl. No. 10 2011 000 696.6 filed on Feb. 14, 2011, the entire disclosure of which is incorporated herein by reference.

BACKGROUND OF THE INVENTION

1. Field of the Invention

The invention relates to an electric energy store of a motor vehicle, in particular a high voltage energy store of a hybrid vehicle or an electric vehicle.

2. Description of the Related Art

Hybrid and electric vehicles have high voltage energy stores that are discharged to a pronounced extent during motor operation of the vehicle and are charged to a more pronounced extent during generator operation of the respective electric machine. Electric energy stores have a housing and storage modules accommodated in the housing.

Separate apparatuses are used in the prior art to position and mount the electric energy store in a motor vehicle. For instance, DE 10 2008 059 680 A1 discloses an apparatus for securing a battery. The apparatus has a trough-like accommodating element for accommodating a battery, a hoop that encloses the trough-like accommodating element, and a fixing element. The fixing element is fastened to the hoop and functions to fix the battery in the trough-like accommodating element.

Accordingly the prior art requires a separate apparatus for fastening or mounting an electric energy store of a motor vehicle in the motor vehicle. As a result, the number of apparatuses to be installed in the motor vehicle is increased and the weight of the motor vehicle is increased.

Accordingly, an object of the invention is to provide a novel electric energy store of a motor vehicle.

SUMMARY OF THE INVENTION

The invention relates generally to a housing for an electric energy store. The housing has a supporting element with an annular supporting frame made from a fiber reinforced plastic and via which the electric energy store can be connected to a body structure of a motor vehicle.

The annular supporting frame that comprises a fiber reinforced plastic is a constituent part of the housing of the electric energy store. Accordingly, the electric energy store according to the invention can be fastened directly via the housing to a body structure of a motor vehicle. No separate apparatuses are required to fasten the electric energy store. Furthermore, a high strength and an extremely low weight can be realized by forming the supporting frame from a fiber reinforced plastic.

The annular supporting frame of the supporting element preferably is hollow. As a result, the weight of the electric energy store can be reduced further.

The fiber reinforced plastic supporting frame of the supporting element preferably is connected by adhesive bonding to at least one supporting plate of the supporting element. The supporting plate extends between the annular supporting frame and preferably is made from metal. The metal supporting plate preferably functions for temperature control, namely cooling and/or heating the storage modules, and as a result, defines a temperature control element. This functional integration of support and temperature control reduces the number of required assemblies, reduces the complexity of the construction of the energy store and reduces the weight.

DETAILED DESCRIPTION OF THE PREFERRED EMBODIMENTS

Figure 1:
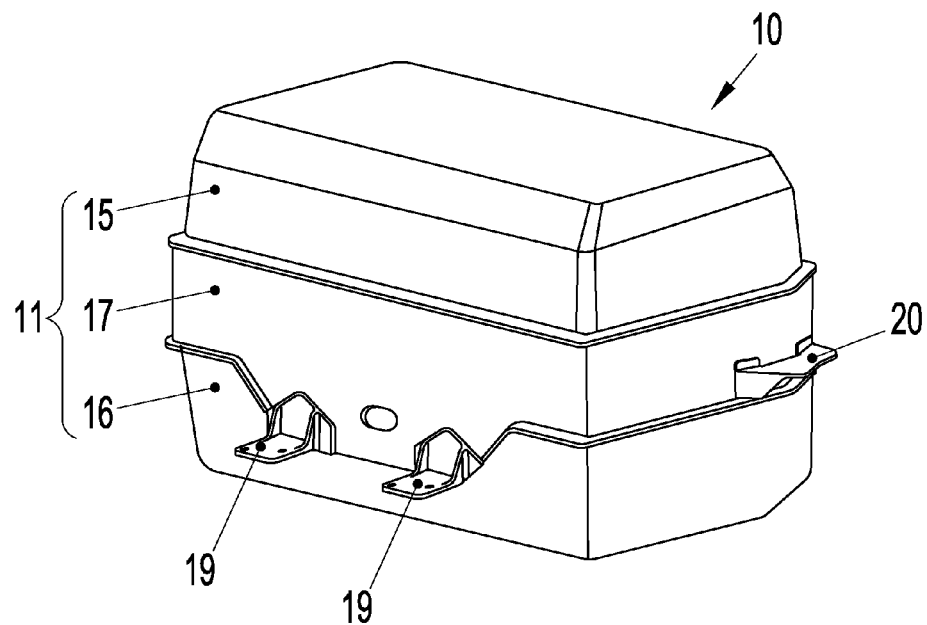
FIG. 1 is a perspective view of one exemplary embodiment of an electric energy store according to the invention.
Figure 2:
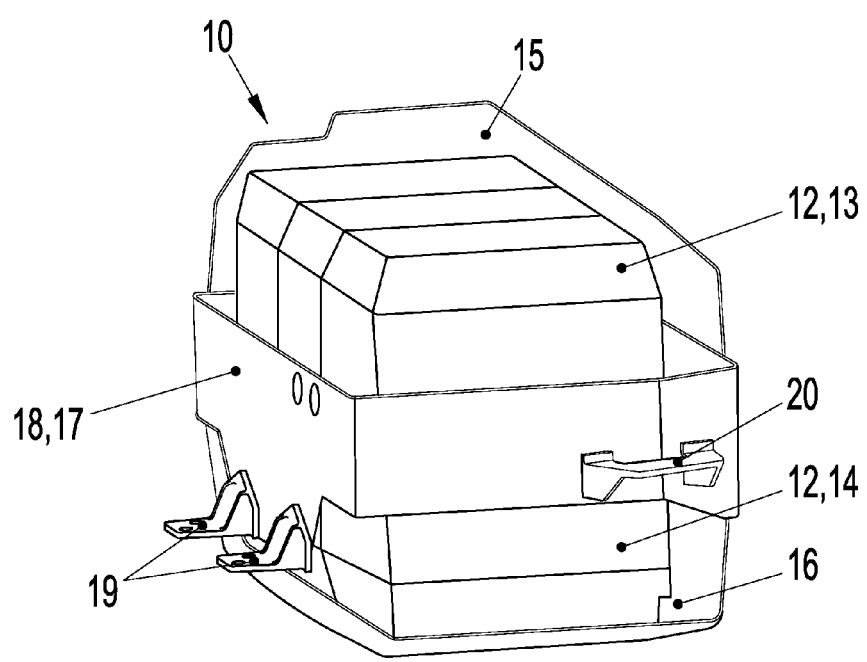
FIG. 2 is a further perspective view of the electric energy store of FIG. 1 with transparent storage modules.
Figure 3:
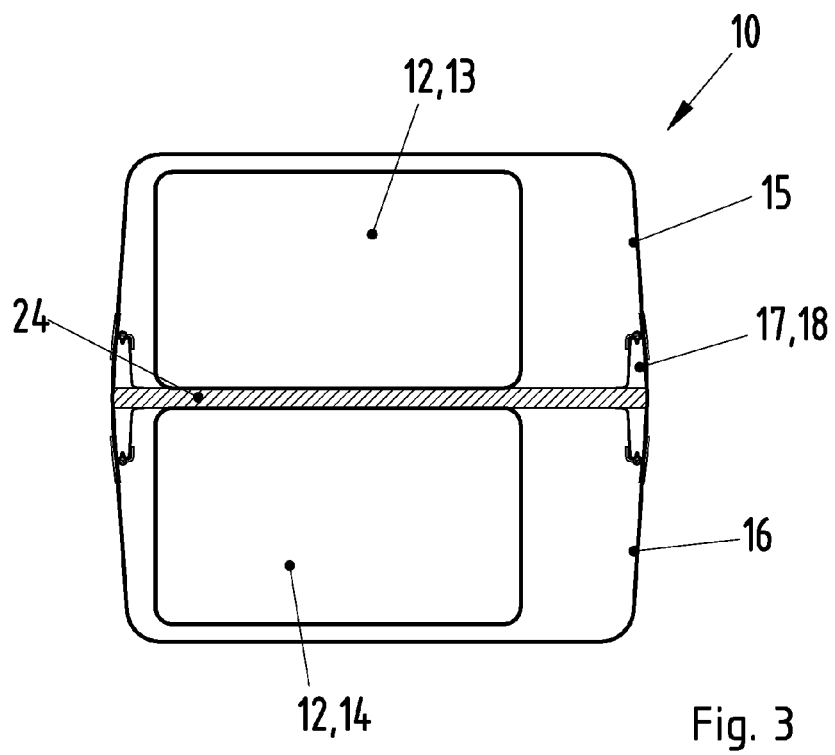
FIG. 3 is a cross section through the electric energy store.

The invention relates to an electric energy store of a motor vehicle, in particular a high voltage energy store of a hybrid vehicle or an electric vehicle. A drive assembly of a hybrid vehicle or an electric vehicle comprises an electric machine that can be operated as a motor and as a generator. During motor operation of the electric machine, the high voltage electric energy store is discharged to a more pronounced extent by the electric machine. During generator operation of the electric machine, the high voltage electric energy store is charged to a more pronounced extent by the electric machine.

The electric energy store 10 has a housing 11 and storage modules 12 accommodated in the housing 11. In the preferred embodiment of the invention shown, the storage modules 12 form upper and lower module assemblies 13 and 14, each of which comprises a plurality of storage modules 12.

The housing 11 has an upper housing part 15, a lower housing part 16 and a supporting element 17 that comprises an annular supporting frame 18. The term annular in this context is not intended to suggest a round structure, but rather refers to a closed loop that may be generally rectangular. The upper and lower housing parts 15 and 16 are connected releasably to the annular supporting frame 18 of the supporting element 17 of the housing 10 so that the supporting frame 18 is positioned between the upper and lower housing parts 15 and 16. The upper and lower housing parts 15 and 16 and the supporting element 17 or the supporting frame 18 together form the housing 11 of the electric energy store 10.

The electric energy store 10 can be connected exclusively via the supporting frame 18 to the body structure of a motor vehicle. Fastening sections 19, 20 are formed on the supporting frame 18 for connecting the electric energy store 10 to the body structure. The supporting frame 18 and therefore the housing 11 of the electric energy store 10 can be screwed to the body structure of the motor vehicle via the fastening sections 19, 20.

The fastening sections 19 and 20 are webs and are an integral constituent part of the supporting frame 18. The fastening sections 19 and 20 have recesses (not shown), through which fastening screws (not shown) extend to fasten the electric energy store 10 to a body structure.

All of the forces and moments that act on the electric energy store 10 are absorbed by the supporting frame 18 or supporting element 17. The annular supporting frame 18 is formed from a fiber reinforced plastic, for example a glass fiber reinforced or carbon reinforced plastic. As a result, a high strength of the annular supporting frame 18 is achieved with as low a weight as possible.

The upper and lower housing parts 15 and 16 are non-supporting, cover-like components that do not absorb any forces and moments. Accordingly, the upper and lower housing parts 15 and 16 can be extremely thin-walled and light weight. The upper and lower housing parts 15 and 16 preferably are manufactured from a plastic, in particular from a fiber reinforced plastic.

Figure 4:
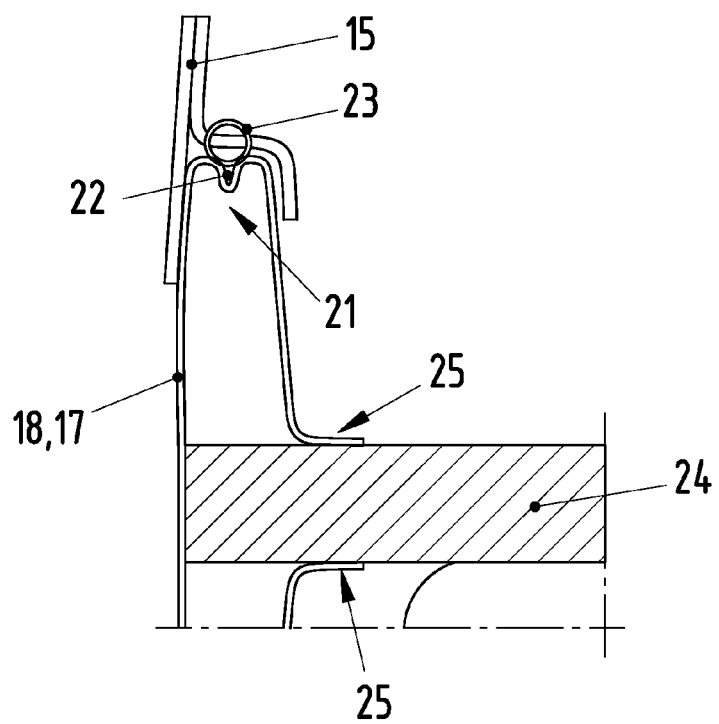
FIG. 4 shows a detail of FIG. 3.

As can be seen best in FIG. 4, the annular supporting frame 18 of the supporting element 17 is hollow, thereby further reducing the weight of the housing 11 and therefore of the electric energy store 10.

A groove 22 is formed in each of the opposite ends 21 of the hollow fiber reinforced plastic supporting frame 18 and each groove 22 receives a seal 23 so that the respective seal 23 extends around the supporting frame 18 at the corresponding groove 22. The seal 23 is shown in the nondeformed state in FIG. 4. The upper and lower housing parts 15 and 16 are mounted to and enclose the opposite respective ends of the supporting frame 18 and are sealed to the supporting frame 18 by the respective seals 23.

The supporting element 17 further comprises at least one supporting plate 24 that extends between spaced apart locations on the annular supporting frame 18 of the supporting element 17. The supporting plate 24 preferably is manufactured from metal, for example from a high strength aluminum alloy, and the supporting frame 18 is bonded adhesively to the supporting plate 24 via sections 25 of the supporting frame 18 that lie at the top and at the bottom on the supporting plate 24. As a result, a simple connection is produced between the fiber reinforced plastic supporting frame 18 and the metal supporting plate 24.

The storage modules 12 of the module assemblies 13 and 14 are connected to the supporting plate 14 or to the supporting frame 18. Each storage module 12 of the module assemblies 13 and 14 preferably is connected individually to one supporting plate 24 so that the storage modules 12 of the upper module assembly 13 rest on the supporting plate 24, whereas the storage modules 12 of the lower module assembly 14 are suspended from the supporting plate 24. Alternatively, the storage modules 12 of the module assemblies 13 and 14 may be connected individually to the supporting frame 18 so that the storage modules 12 of the upper module assembly 13 rest on the supporting frame 18, whereas the storage modules 12 of the lower module assembly 14 are suspended from the supporting frame 18.

Each supporting plate 24 further functions to control the temperature of the storage modules 12 of the module assemblies 13 and 14, namely to cool and/or heat them. Each supporting plate 24 then also is configured as a temperature control plate or temperature control element. To this end, each supporting plate 24 then is hollow and a temperature control medium flows through at least one cavity of the respective supporting plate 24 to heat and/or to cool the storage modules 12 that are fastened on the respective supporting plate 24 or the storage modules 12 that adjoin the respective supporting plate 24.

What is claimed is:

1. An electric energy store of a motor vehicle, comprising:
   a supporting element with an outer periphery;
   an annular supporting frame made from a fiber reinforced plastic, the annular supporting frame having at least one hollow wall extending around the outer periphery of the supporting element, fastening webs projecting integrally out from the annular supporting frame and configured for connecting the electric energy store to a body structure of a motor vehicle;
   at least one non-supporting housing part mounted to the hollow wall and opposed to the supporting element; and
   storage modules mounted to the supporting element inward of the annular supporting frame and between the supporting element and the housing part.

2. The electric energy store of claim 1, wherein the supporting element has at least one supporting plate made from metal and extending between spaced apart locations on the annular supporting frame, the fiber reinforced plastic supporting frame being bonded adhesively to the metal supporting plate.

3. The electric energy store of claim 2, wherein supporting plate is manufactured from aluminum or from an aluminum alloy.

4. The electric energy store of claim 2, wherein the supporting plate is disposed and configured to cool or heat the storage modules.

5. The electric energy store of claim 4, wherein the supporting plate has a cavity through which a temperature control medium flows.

6. The electric energy store of claim 1, wherein the at least one housing part comprises upper and lower housing parts connected releasably to opposite upper and lower ends of the supporting frame.

7. The electric energy store of claim 6, further comprising upper and lower seals between the respective upper and lower housing parts and the supporting frame.

8. The electric energy store of claim 6, wherein the upper and lower housing parts are non-supporting covers.

9. The electric energy store of claim 1, wherein the storage modules comprise a first module assembly fastened from above and resting on the supporting element and a second module assembly fastened from below and suspended from the supporting element.

10. The electric energy store of claim 9, wherein the at least one hollow wall comprises an upper hollow wall surrounding the first module assembly and a lower hollow wall surrounding the second module assembly.

11. The electric energy store of claim 10, wherein the upper and lower hollow walls of the annular supporting frame are connected integrally with one another.

12. The electric energy store of claim 10, wherein each of the upper and lower hollow walls has an inwardly directed flange bonded adhesively to the supporting element.

13. The electric energy store of claim 1, wherein the annular supporting frame has at least first and second angularly aligned wall sections, the fastening webs comprising a first fastening web projecting integrally out from the first wall section of the annular supporting frame and a second fastening webs projecting integrally out from the second wall section of the annular supporting frame.

14. The electric energy store of claim 13, wherein each of the fastening webs has at least one recess configured for receiving a fastening screws to fasten the electric energy store to the body structure of the vehicle.

15. The electric energy store of claim 1, wherein each of the at least one hollow wall has an outer wall section facing outwardly on the annular supporting frame and an inner wall section facing inwardly on the annular supporting frame and facing the storage modules.

16. The electric energy store of claim 15, further comprising at least one groove formed in the annular supporting frame between the outer wall section and the inner wall section, and at least one seal secured in the groove, the seal being engaged with the non-supporting housing part.

* * * * *